United States Patent [19]

Luick

[11] 4,062,114
[45] Dec. 13, 1977

[54] VEGETATION CUTTING APPARATUS

[76] Inventor: Woodrow Wilson Luick, 4410 Friar Tuck, Corpus Christi, Tex. 78411

[21] Appl. No.: 684,359

[22] Filed: May 7, 1976

[51] Int. Cl.² .................. A01D 55/18; B26B 27/00
[52] U.S. Cl. .................................. 30/276; 56/12.7; 30/347
[58] Field of Search ............... 30/276, 347; 56/12.7, 56/295; 15/198

[56] References Cited

U.S. PATENT DOCUMENTS

| 3,104,510 | 9/1963 | Voigt | 56/295 |
| 3,320,732 | 5/1967 | Kirk | 56/295 |
| 3,474,608 | 10/1969 | Frick | 56/295 |
| 3,831,278 | 8/1974 | Voglesonger | 30/276 |
| 3,895,440 | 7/1975 | Pittinger | 30/347 X |

FOREIGN PATENT DOCUMENTS

| 572,798 | 3/1933 | Germany | 15/198 |
| 556,632 | 12/1974 | Switzerland | 30/276 |

Primary Examiner—J. C. Peters
Attorney, Agent, or Firm—Turner Moller, Jr.

[57] ABSTRACT

There is disclosed a lawn trimmer/edger incorporating a relatively flexible monofilament cutting element of finite length. A number of techniques are disclosed for temporarily securing the monofilament element to a head attached to the rotating shaft of the edger/trimmer.

8 Claims, 14 Drawing Figures

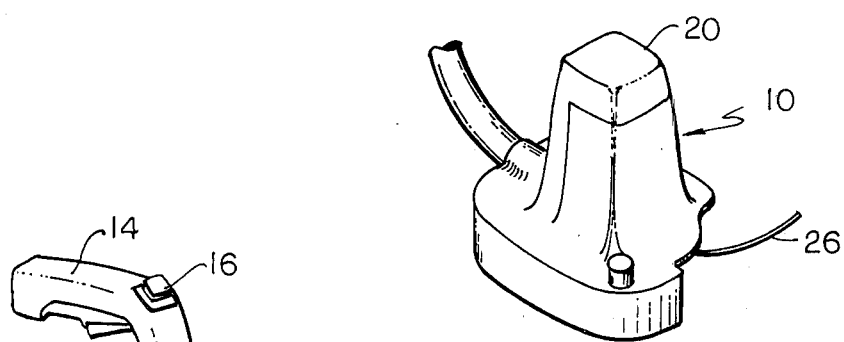
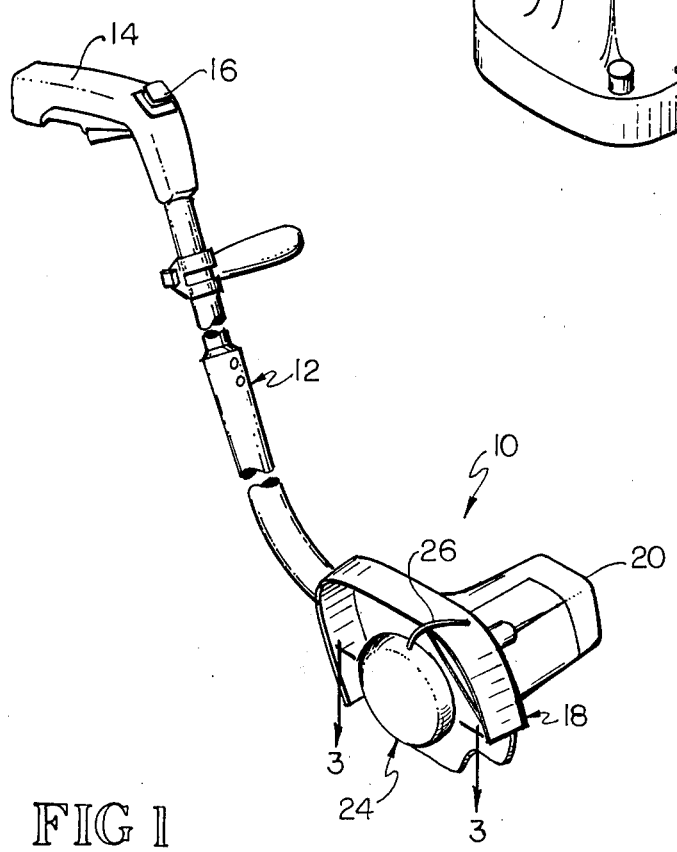

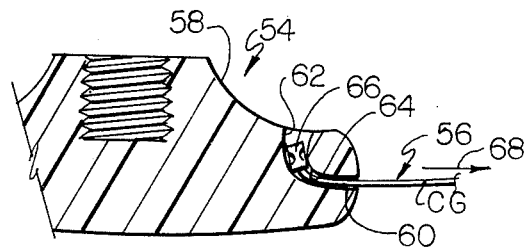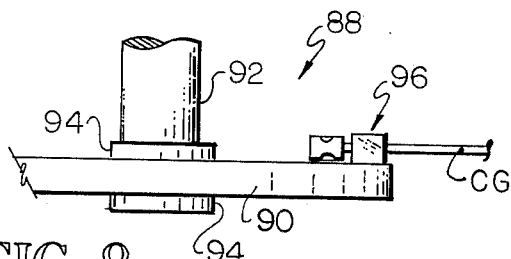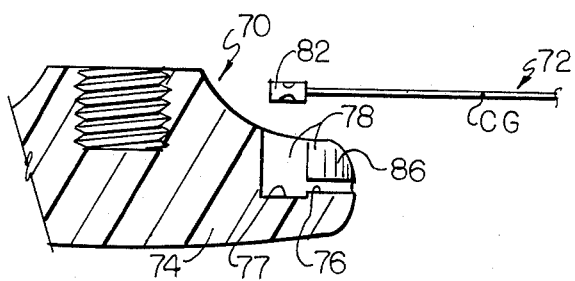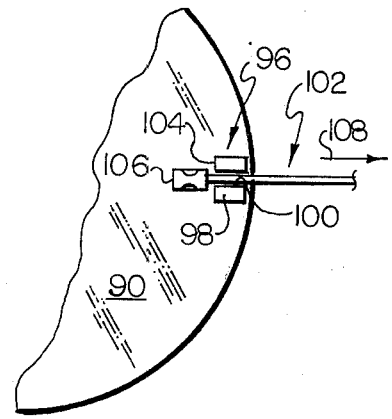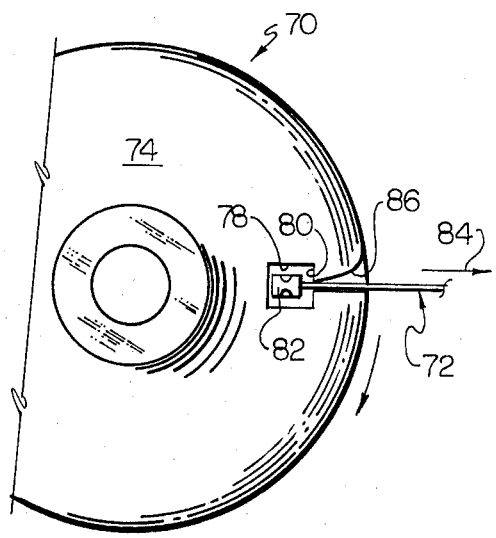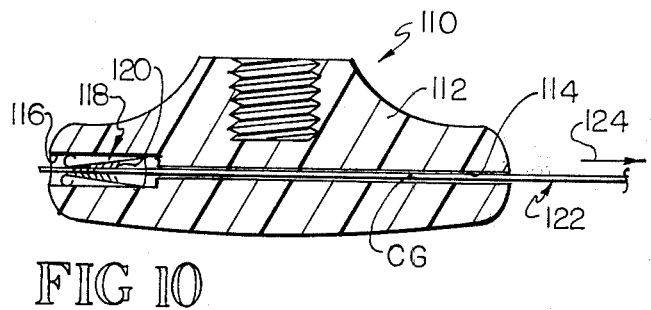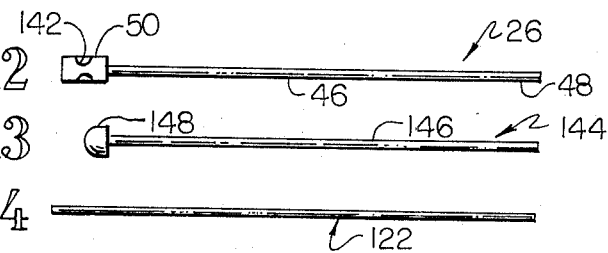

VEGETATION CUTTING APPARATUS

The provision of rotary lawn edgers/trimmers utilizing a relatively flexible monofilament cutting element is well known in the prior art. These devices typically comprise a head attached to a motor shaft for rotation therewith and carrying one or more spools of monofilament. Devices of this type have a number of disadvantages: (1) the rotatable head is itself inordinately expensive since it is designed to house a number of spools; (2) the weight of the head is rather high requiring oversized motors for the actual amount of cutting work performed; (3) users tend to unspool too much monofilament thereby overloading the motor; (4) typically only a minimum sized monofilament may be used; and (5) users typically are required to load the spools carried by the head from a larger spool of material which is onerous and cumbersome.

Possibly for these reasons or others, the use of finite length cutting elements has been suggested in flexible cutting element edger/trimmers as disclosed in U.S. Pat. Nos. 3,708,967; 3,831,278; 3,892,037 and 3,895,440 along with France Pat. No. 1,281,450. Since the cutting elements of these disclosures undergo normal wear, tear and breakage, it is apparent that the old cutting element must be removed and replaced with a new one of proper length. It will be apparent upon inspection that replacement of the cutting elements of these disclosures is somewhat complex and time consuming.

Another problem inherent in flexible cutting element edger/trimmers is that the user may select a heavier monofilament in a particular device than it was designed for. This normally leads initially to motor overheating followed shortly by motor failure.

It is an object of this invention to provide an improved vegetation cutting device having means for quickly and expeditiously replacing a worn cutting element.

Another object of this invention is to provide a vegetation cutter incorporating means to assure that monofilament heavier than a design assumption is not used in the device.

A further object of the invention is to provide an improved cutting element for a vegetation cutter.

In summary, one aspect of this invention comprises a vegetation cutting apparatus including a driving mechanism having a shaft rotatable about an axis, a cutting element holder mounted on the shaft for rotation therewith providing a cutting element receiving passage defining a centrifugal force induced direction of cutting element movement, an unspooled generally flexible finite length non-metallic cutting element removably positioned in the receiving passage and eccentrically disposed relative to the axis and having a cutting end portion extending outwardly of the holder, and means preventing movement of the cutting element from the receiving passage in the centrifugal force induced direction.

In summary, another aspect of this invention comprises a vegetation cutting apparatus including an electric motor having a rotatable output shaft, having the capability of rotating a flexible cutting element of predetermined cross-sectional size without overheating and having the characteristic of overheating on rotating a flexible cutting element of cross-sectional size greater than the predetermined cross-sectional size; a cutting element holder mounted on a shaft for rotation therewith providing a generally radially extending cutting element passage of sufficient size to accept cutting elements of the predetermined size and to reject cutting elements of greater than the predetermined size, a generally flexible non-metallic cutting element in the passage having the cutting element end portion extending outwardly of the holder into cutting position; and means maintaining the cutting element in the passage during use.

In summary, another aspect of this invention comprises a cutting element including an elongate plastic material monofilament, less than one foot in length, having an enlargement on one end thereof, the cutting element being non-symmetrical about any axis transverse to the long dimension of the monofilament.

IN THE DRAWINGS:

FIG. 1 is a broken isometric view of a typical vegetation cutting device constructed in accordance with the principles of this invention and illustrated in an edging mode.

FIG. 2 is a view illustrating the device of FIG. 1 in a grass trimming configuration;

FIG. 5 is a broken view, similar to FIG. 3, illustrating another embodiment of the invention;

FIG. 6 is a view similar to FIG. 5, illustrating a further embodiment of the invention;

FIG. 7 is a broken top view of the cutting element holder of FIG. 6;

FIG. 8 is a broken side view illustrating another embodiment of the cutting element holder of this invention;

FIG. 9 is a top view of the device of FIG. 8;

FIG. 10 is a view similar to FIG. 3, illustrating an additional embodiment of this invention;

FIGS. 12 and 13 illustrate cutting elements which may be used with any of the cutting element holders illustrated in FIGS. 3–9; and FIG. 14 is a side view of a cutting element which may be used in the embodiments of FIGS. 10 and 11.

Figure 3:
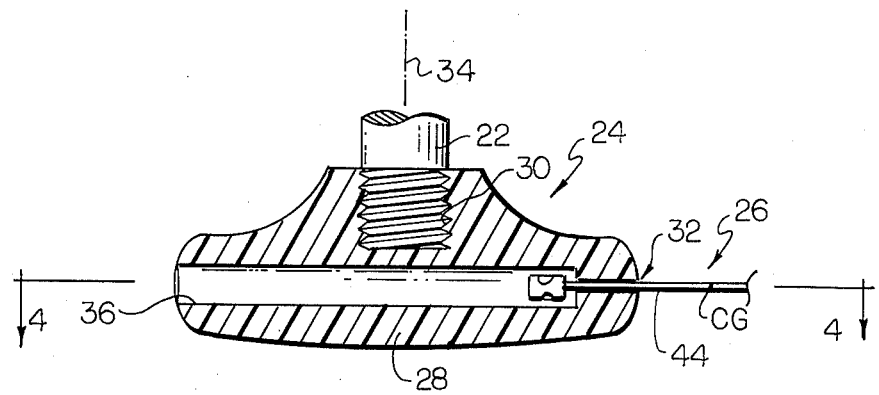
FIG. 3 is an enlarged cross-sectional view of the device of FIG. 1 taken substantially along line 3—3 thereof, as viewed in the direction indicated by the arrows.

Referring to FIGS. 1–3, there is illustrated a vegetation cutter 10 comprising, as major components, a framework 12 including a handle 14 and control switch 16, a housing or guard arrangement 18 and a driving mechanism or motor 20 having an output shaft 22 on which is mounted a head or holder 24 and cutting element 26 of this invention. As will be apparent from a comparison of FIGS. 1 and 2, the housing 18 and motor 20 may be adjusted relative to the framework 12 thereby providing an edger configuration, as in FIG. 1, or a trimmer configuration, as in FIG. 2.

Figure 4:
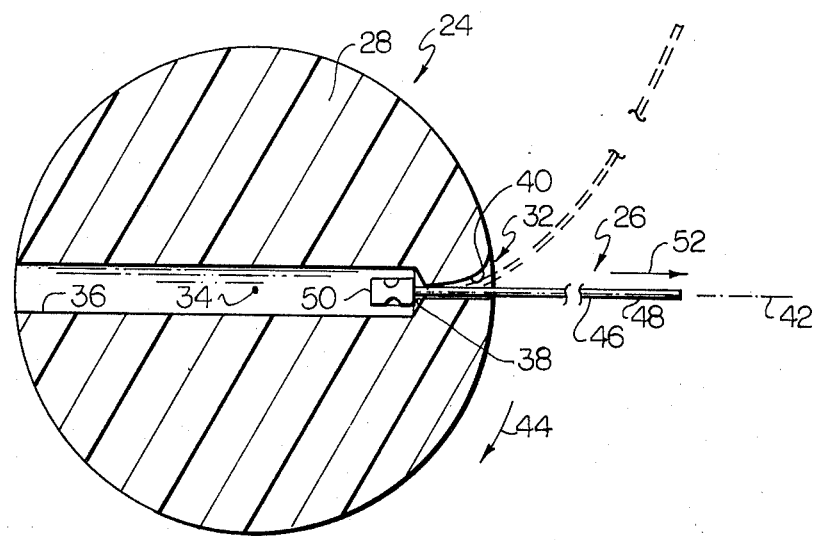
FIG. 4 is a cross-sectional view of the cutting element holder illustrated in FIG. 3, taken substantially along line 4—4 thereof as viewed in the direction illustrated by the arrows.

Referring to FIGS. 3 and 4, the holder 24 comprises a body 28 of any suitable material, such as wood, plastic, or metal, providing a threaded connection 30 to the shaft 22. The body 28 may be of any suitable shape and includes a cutting element receiving passage 32 generally radial with respect to an axis 34 of the shaft 22. The receiving passage 32 communicates with a larger coaxial threading passage 36 allowing the cutting element 26 to be inserted through the body 28 into the position illustrated in FIGS. 3 and 4. As is apparent, the junction of the passges 32, 36 provides a shoulder or abutment 38 for purposes more fully explained hereinafter.

As illustrated in FIG. 4, the passage 32 provides an arcuate wall 40 which radially outwardly diverges relative to an axis 42 representing the normal cutting position of the cutting element 26. With the body 28 rotating in a clockwise direction, as indicated by the arrow 44, the wall 38 may be considered to be angularly offset in a direction opposite from the direction of rotation. The purpose of the offset wall 40 is to allow the cutting element 26 to bend over a relatively long radius to the phantom position illustrated in FIG. 4 in the event the cutting element 26 contacts an obstacle such as a rock, a sidewalk, tree, or the like. If the receiving passage 32 were of uniform cross-sectional size and the cutting element 26 contacted a rock during use, the cutting element 26 must necessarily bend over a relatively sharp radius thereby tending to snap the cutting element 26 in two.

Another feature of the holder 24 resides in the minimum dimension of the receiving passage 32. Since the motor 20 of typical edger/trimmers is electrical, the motor 20 tends to overheat if the cutting load is greater than a design assumption. The magnitude of the cutting load depends, inter alia, on the diameter of the cutting element 26. For example, of one were to utilize a 500 pound test monofilament of predetermined length in a device in which the motor 20 was designed to accommodate a 200 pound test monofilament of the same length, the motor 20 would undoubtedly overheat and fail. To obviate this difficulty, the minimum dimension in the passage 32 is selected to pass cutting elements of a size compatible with the design characteristics of the motor 20 and to reject or not accept cutting elements of greater than this predetermined size. Accordingly, the minimum dimension in the passage 32 constitutes a safety feature for the motor 20.

As will be explained more fully hereinafter, the cutting element 26 comprises an elongate section of monofilament material 46, such as nylon or the like, having a cutting end portion 48 extending outwardly of the body 28. On the opposite end of the monofilament 46 is an enlargement 50. As is evident from FIG. 4, the entire mass of the cutting element 26 is eccentrically disposed relative to the axis 34 so that centrifugal force developed during rotation of the holder 24 biases the cutting element 26 radially outwardly in a centrifugal force induced direction indicated by the arrow 52. As the cutting element 26 is biased in the direction 52, the enlargement 50 comes to rest against the abutment 38 which acts to prevent movement of the cutting element 26 from the receiving passage 32 in the centrifugal force induced direction 52 but allows movement of the cutting element 26 toward the threading passage 36 when rotation is stopped. It will accordingly be apparent that the cutting element 26 is held in an operative cutting position by centrifugal force induced upon rotation of the holder 24 while allowing convenient removal of the cutting element 26 from the holder 24 as by pushing on the end of the monofilament 46. In this regard, the cutting element 26 is preferably longer than the diameter of the body 28 so that the abutment 50 will clear the passage 36 when the monofilament 46 is substantially pushed through the passage 32.

As is apparent from FIGS. 3 and 4, the cutting element 26 is eccentrically disposed in the holder 24 and the centrifugal force developed on the cutting element 26 depends, in part, upon the distance between the axis 34 and the center of gravity CG of the cutting element 26. If the center of gravity were aligned with the axis 34, the cutting element 26 would not sense any centrifugal force since any forces developed on the opposite ends of the cutting element would be in opposite direction and would therefore cancel. Accordingly, the center of gravity of the cutting element 26 is desirably between the periphery of the shaft 22 and the end of the cutting portion 48 when the cutting element 26 is in its operative position. Most desirably, the center of gravity CG is radially outward of the perimeter of the holder 24. In the alternative, the center of gravity may reside between a projection of the exterior of the shaft 22 and the perimeter of the holder 24, as by altering the location of the junction between the passages 32, 36. When the center of gravity approaches the axis from the periphery of the shaft 22, the amount of centrifugal force acting on the cutting element 26 is insufficient to retain the cutting element 26 in operative position when it contacts a rock or the like. Accordingly, the shoulder 38 is positioned in the passageways 32, 36 such that the center of gravity CG is outward of the shaft exterior.

In use, the cutting end portion 48 of the cutting element 26 is inserted through the passage 36 and the passage 32. The user may then grasp the cutting end portion 48 and pull the cutting element 26 to the position illustrated in FIG. 4. By manipulating the control switch 16, the motor 20 is energized thereby rotating the holder 24 and the cutting element 26. The vegetation cutter 10 may be used in a conventional manner in either the edging configuration illustrated in FIG. 1 or the trimmer configuration illustrated in FIG. 2. If the monofilament 46 should contact a rock or other uncuttable object, the cutting element 26 may bend over the relatively long radius afforded by the wall 40 into the phantom position illustrated in FIG. 4 to get by the obstacle.

When the cutting element 26 becomes substantially worn, it may be removed from the holder 28 by stopping the motor 20 and pushing the monofilament 46 in a direction opposite to the centrifugal force induced direction 52. If the cutting element 26 has been worn so that the abutment 50 does not clear the passage 36, the holder 24 may be rotated and positioned until the passage 36 is vertical whereupon the cutting element 26 will fall out of the passages 32, 36.

Referring to FIG. 5, there is illustrated a holder 54 comprising another embodiment of the invention. The holder 54 differs from the holder 24 only in the configuration of the passages for threading and receiving the cutting element 56. The holder 54 comprises a body 58 having a generally radial cutting element receiving passage 60 and a generally axial threading passage 62 arcuately merging thereinto. The passage 62 is preferably larger than the passage 60 thereby providing a shoulder or abutment 64 for preventing further movement of the enlargement 66 in the centrifugal force enduced direction 68. It will be apparent that the holder 54 may conveniently provide a plurality of receiving and threading passges 62 around the periphery of the body 58 to accommodate a plurality of cutting elements 56. The receiving passage 60 may be configured to provide an angularly offset wall (not shown) analogous to the wall 40 of the holder. In all other respects, the holder 54 may be the same as the holder. It will likewise be apparent that the passage through the body 58 may be too small to receive the enlargement 66 so that the abutment or shoulder is provided by the top surface of the body 58 and the threading passage is external thereto. The passage 60 is desirably sized to pass only those monofilament cutting elements that are designed for use with a particular motor used with the holder 54.

Referring to FIGS. 6 and 7, there is illustrated a holder 70 comprising another embodiment of the invention. The holder 70 differs from the holders 24, 54 only in the configuration of the passages for threading and receiving the cutting element 72. The holder 70 comprises a body 74 having a generally radial cutting element receiving passage 76 having an enlarged section 77 radially closer to the center of the holder 70 and a generally axial threading passage 78 generally perpendicular thereto. A shoulder 80 is accordingly provided for preventing movement of the enlargement 82 in the centrifugal force induced direction 84. It will be apparrent that the holder 70 may conveniently provide a plurality of receiving and threading passages 76, 78 around the periphery of the body 74 to accommodate a plurality of cutting elements 72. The receiving passage 76 may be configured to provide an angularly offset wall 86 to prevent snapping the cutting element 72 when an obstacle is contacted thereby. In all other respects, the holder 70 may be the same as the holders 24, 54.

Referring to FIGS. 8 and 9, there is illustrated a holder 88 comprising another embodiment of the invention. The holder 88 comprises a body or plate 90 captivated to a shaft 92 as by a pair of nuts 94. Positioned at one or more locations about the periphery of the plate 90 is a clip 96 comprising a pair of upstanding legs 98 defining a passage 100 for receiving a cutting element 102. It will be apparent that the upper part of the passage 100, like the upper part of the receiving passage 76 in the embodiment of FIG. 6, comprises a passage for threading the cutting element 102 into the lower part of the slot between the legs 98. The clip 96 provides a shoulder or abutment 104 for preventing movement of the enlargement 106 in the centrifugal force induced direction 108. It will be apparent that the minimum dimension in the passage 100 may be selected to reject over-sized cutting elements.

Referring to FIG. 10, there is illustrated a holder 110 comprising another embodiment of the invention. The holder 110 is superficially similar to the holders 24, 54, 70 and comprises a body 112 having a generally radial cutting element receiving passage 114 and another larger passage 116 communicating therewith. Press fit into the passage 116 is a one-way gripper device 118 having a multiplicity of prongs 120 thereon which prevent movement of the cutting element 122 in the centrifugal force induced direction 124 and which allow movement in the opposite direction. Since the prongs 120 are directional, i.e. pointed generally away from the passage 114, the gripper 118 need not exert a substantial static force on the cutting element 122. Because the cutting element 122 is eccentrically disposed in the holder 110, centrifugal force will tend to tighten the element 122 in the gripper 118. Thus, the holder 110 is capable of using a cutting element of uniform cross-sectional size throughout the length thereof rather than requiring a specially configured cutting element.

Figure 11:
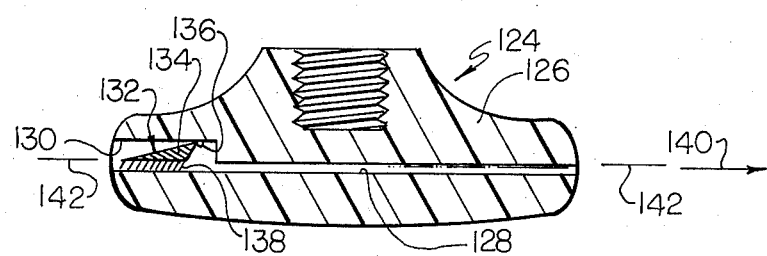
FIG. 11 is a view similar to FIG. 3 illustrating a further embodiment of the cutting element holder of this invention.

Referring to FIG. 11, there is illustrated a holder 124 comprising another embodiment of the invention. The holder 124 is quite similar to the holder 110 and comprises a body 126 having a generally radial cutting element receiving passage 128 therein merging with another passage 130. Located in the passage 130 is a one-way gripper device 132 comprising a shoe 134 connected to the upper portion of the body 126 by a suitable pivot connection 136. The shoe 134 provides a plurality of prongs 138 for preventing movement of a cutting element in the centrifugal force induced direction 140. It will accordingly be apparent that the holder 124 is capable of using a cutting element of constant cross-sectional size. The holder 124 is conveniently made in two parts having a parting line 142 to allow assembly of the one-way gripper 132.

Referring to FIG. 12, the enlargement 50 of the cutting element 26 may comprise a metallic sleeve crimped as at 142 to retain the monofilament therein.

Referring to FIG. 13, a cutting element 144 may be made by heating or melting one end of a monofilament section 146 and pressing it against a firm support to provide a deformed portion or button 148 to provide an enlargement.

The cutting elements 26, 144 may be of any desired length less than about one foot in length and are normally on the order of 2-8 inches in length depending upon the horsepower rating of the motor 20 and the particular embodiment holder selected. It will be apparent that the cutting elements 26, 144 are asymmetric about any axis transverse to the long dimension of the monofilament 46, 146. The monofilament material 46, 146 may be of any desired diameter or test strength but is normally in the range of 100–500 pound test. It will be apparent that either of the cutting elements 26, 144 are adapted for use with the holders of FIGS. 3–9.

Referring to FIG. 14, the cutting element 122 comprises a simple length of monofilament material and is adapted for use in the embodiments of FIGS. 10 and 11.

I claim:

1. Apparatus for cutting vegetation comprising
a driving mechanism having a shaft rotatable about an axis;
a cutting element holder mounted on the shaft for rotation therewith providing an outer peripheral surface and a cutting element passage opening through the peripheral surface on opposite sides of the axis defining a centrifugal force induced direction of cutting element movement, the cutting element passage providing a threading section and a receiving section of smaller dimension, the junction between the threading and receiving sections comprising an abutment;
an unspooled generally flexible finite length non-metallic cutting element removably positioned in the receiving passage section and eccentrically disposed relative to the axis and having a cutting end portion extending outwardly of the holder and an enlargement on an end opposite from the cutting end portion engaging the abutment; and
means preventing movement of the cutting element from the receiving passage section in the centrifugal force induced direction comprising the enlargement on the cutting element and the abutment in the passage;
the holder comprising means defining a cutting element inserting and removing path communicating with the receiving passage section for inserting and removing the cutting element from the receiving of passage section while the holder is attached to the shaft, the removing means including means for removing the cutting element along the removing path by the application of a single force on the cutting element in a direction opposite to the centrifugal force induced direction.

2. The apparatus of claim 1 wherein the opposite end portion of the cutting element resides between the axis and the cutting end portion when the holder is rotated.

3. The apparatus of claim 1 wherein the engagement between the shoulder and abutment comprise the sole means of preventing movement of the cutting element from the receiving passage in the centrifugal force induced direction.

4. The apparatus of claim 1 wherein the center of gravity of the cutting element is positioned between the exterior of the shaft and the cutting end portion when the holder is rotated.

5. The apparatus of claim 4 wherein the center of gravity of the cutting element is positioned exteriorly of the holder.

6. The apparatus of claim 1 wherein the driving mechanism rotates the shaft and holder in a predetermined direction and the receiving passages comprises an arcuate wall angularly offset from an axis of the receiving passage in a direction opposite to the predetermined direction of rotation.

7. The apparatus of claim 1 wherein the driving mechanism comprises an electric motor having the capability of rotating a flexible cutting element of predetermined cross-sectional size without overheating and having the characteristic of overheating on rotating a flexible cutting element of cross-sectional size greater than the predetermined cross-sectional size, the cutting element holder providing a cutting element gauge passage of sufficient size to accept cutting elements of the predetermined size and to reject cutting elements of greater than the predetermined size.

8. The apparatus of claim 1 wherein the cutting element passage is substantially linear.

* * * * *